United States Patent
Cresswell et al.

(10) Patent No.: US 6,657,445 B2
(45) Date of Patent: Dec. 2, 2003

(54) SENSOR MAT CONFIGURATION ENABLING ACTUAL RESISTANCE VALUES OF FORCE-DEPENDENT RESISTORS OF A SENSOR MAT TO BE DETERMINED

(75) Inventors: Justin Cresswell, Lincoln Park, MI (US); Arnulf Pietsch, Regensburg (DE); Gerhard Wild, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 16 days.

(21) Appl. No.: 10/116,825

(22) Filed: Apr. 5, 2002

(65) Prior Publication Data

US 2003/0160621 A1 Aug. 28, 2003

Related U.S. Application Data

(60) Provisional application No. 60/359,084, filed on Feb. 22, 2002.

(51) Int. Cl.[7] .............................................. G01R 27/08
(52) U.S. Cl. ..................... 324/691; 324/713; 324/721; 73/862.044; 340/667
(58) Field of Search ....................... 280/735; 701/45; 307/10.1; 340/667, 666, 436, 457.1; 73/862.044, 862.045, 862.046; 324/691, 713, 720, 721; 338/320, 25

(56) References Cited

U.S. PATENT DOCUMENTS 5,504,471 A * 4/1996 Lund ........................... 338/320

6,522,155 B2 * 2/2003 Pietsch et al. ............... 324/691

OTHER PUBLICATIONS

Billen, K.: "Occupant Classification System for Smart Restraint Systems", XP–002184965, I.E.E. International Electronics & Engineering, 1999, pp. 33–36 and 38 No month available.

* cited by examiner

*Primary Examiner*—N. Le
*Assistant Examiner*—Vincent Q. Nguyen
(74) *Attorney, Agent, or Firm*—Laurence A. Greenberg; Werner H. Stemer; Gregory L. Mayback

(57) ABSTRACT

A sensor mat configuration includes a sensor mat having row lines, column lines, and a plurality of force-dependent resistors connected between the row lines and the column lines to form a matrix having rows and columns. The sensor mat configuration includes a printed circuit board having a plurality of fixed resistors. The first terminal of each one of the plurality of fixed resistors is connected to a respective one of the column lines, and the second terminal of each one of the plurality of fixed resistors are connected together, thereby forming an additional row of the matrix. The resistances of the plurality of fixed resistors are known within a narrow tolerance range, which enables these resistors to be used in measurements for accurately determining the resistances of the force-dependent resistors of the sensor mat.

8 Claims, 2 Drawing Sheets

SENSOR MAT CONFIGURATION ENABLING ACTUAL RESISTANCE VALUES OF FORCE-DEPENDENT RESISTORS OF A SENSOR MAT TO BE DETERMINED

CROSS-REFERENCE TO RELATED APPLICATION

This application claims the benefit of Provisional Application No. 60/359,084 filed on Feb. 22, 2002.

BACKGROUND OF THE INVENTION

Field of the Invention

It is known to place a sensor mat in the passenger seat of an automobile in order to obtain size and weight information relating to the occupant of the passenger seat. The sensor mat has sensors constructed as force-dependent resistors arranged to form a matrix having rows and columns. Three-dimensional information can be obtained from the mat by considering the X and Y positions of the activated force-dependent resistors, and by considering the resistance values of these activated force-dependent resistors. The weight and size of the occupant can accordingly be estimated, and this information is useful in determining whether to activate an airbag, and in determining what force should be used if activating the airbag. For example, if the pressure profile indicates that a small child is sitting in the passenger seat, and an event occurs which indicates that the passenger airbag should be triggered, then the passenger airbag can be triggered with less force than would be the case if an average size adult were sitting in the passenger seat. Alternatively, the airbag may not be triggered at all.

Typically, a given force-dependent resistor of a sensor mat will have a certain resistance value in a non-activated state, and when activated, the resistance value will decrease proportionally to the applied force. It is difficult to manufacture a sensor mat such that the non-activated resistance values of the force-dependent resistors have values that lie within a narrow tolerance band. It is also known that the resistance values vary with time and with temperature, and it is desirable to be able to take these variances into account when evaluating signals obtained from the sensor mat. In addition, various leakage currents can occur which also affect the ability to accurately evaluate the signals obtained from the sensor mat. In order to be able to accurately evaluate signals that are obtained from the sensor mat, the actual resistance values of the force-dependent resistors in the sensor mat must be accurately determined.

SUMMARY OF THE INVENTION

It is accordingly an object of the invention to provide a sensor mat configuration which overcomes the above-mentioned disadvantages of the prior art apparatus of this general type.

In particular, it is an object of the invention, to provide a sensor mat configuration that enables one to accurately determine the resistance values of the force-dependent resistors such that the known variations from the desired resistance values can be compensated for and the pressure profile of the force-dependent resistors can be accurately obtained.

With the foregoing and other objects in view there is provided, in accordance with the invention, a sensor mat configuration that includes a sensor mat having row lines, column lines, and a plurality of force-dependent resistors connected between the row lines and the column lines to form a matrix having rows and columns. The sensor mat configuration also includes a printed circuit board having a first plurality of fixed resistors. Each one of the first plurality of the fixed resistors has a first terminal and a second terminal. The first terminal of each one of the first plurality of the fixed resistors is connected to a respective one of the column lines and the second terminals of the first plurality of the fixed resistors are connected together, thereby forming an additional row of the matrix.

In accordance with an added feature of the invention, the printed circuit board and the first plurality of the fixed resistors are not integral parts of the sensor mat.

In accordance with an additional feature of the invention, the printed circuit board includes a second plurality of fixed resistors; each one of the second plurality of the fixed resistors has a first terminal and a second terminal. The first terminal of each one of the second plurality of the fixed resistors is connected to a respective one of the row lines and the second terminals of the second plurality of the fixed resistors are connected together, thereby forming an additional column of the matrix.

In accordance with another feature of the invention, the sensor mat includes a plurality of fixed column resistors for checking whether interruptions exist on the column lines and a plurality of fixed row resistors for checking whether interruptions exist on the row lines. Each one of the plurality of the fixed column resistors of the sensor mat has a first terminal connected to a respective one of the column lines. Each one of the first plurality of the fixed column resistors of the sensor mat has a second terminal. The second terminal of each one of the first plurality of the fixed column resistors of the sensor mat are connected together. Each one of the plurality of the fixed row resistors of the sensor mat has a first terminal connected to a respective one of the row lines. Each one of the first plurality of the fixed row resistors of the sensor mat has a second terminal. The second terminals of the first plurality of the fixed row resistors of the sensor mat are connected together.

In accordance with a further feature of the invention, the printed circuit board includes a second plurality of fixed resistors; and each one of the second plurality of the fixed resistors has a first terminal and a second terminal. The first terminal of each one of the second plurality of the fixed resistors are connected to a respective one of the row lines and the second terminals of the second plurality of the fixed resistors are connected together, thereby forming an additional column of the matrix.

In accordance with a further added feature of the invention, the printed circuit board, the first plurality of the fixed resistors, and the second plurality of the fixed resistors are not integral parts of the sensor mat.

With the foregoing and other objects in view there is provided, in accordance with the invention, a method of determining a resistance value of a force-dependent resistor of a sensor mat that includes steps of: providing a sensor mat having row lines, column lines, and a plurality of force-dependent resistors connected between the row lines and the column lines to form a matrix having rows and columns; providing a printed circuit board having a plurality of fixed resistors; providing each one of the first plurality of the fixed resistors with a first terminal and a second terminal; forming an additional row of the matrix by connecting the first terminal of each one of the plurality of the fixed resistors to a respective one of the column lines and by connecting the second terminal of each one of the plurality of the fixed resistors together; using the plurality of the fixed resistors to determine leakage currents effecting the column lines; and using the leakage currents to determine actual resistance values of the plurality of force-dependent resistors.

DESCRIPTION OF THE PREFERRED EMBODIMENTS

Figure 1:
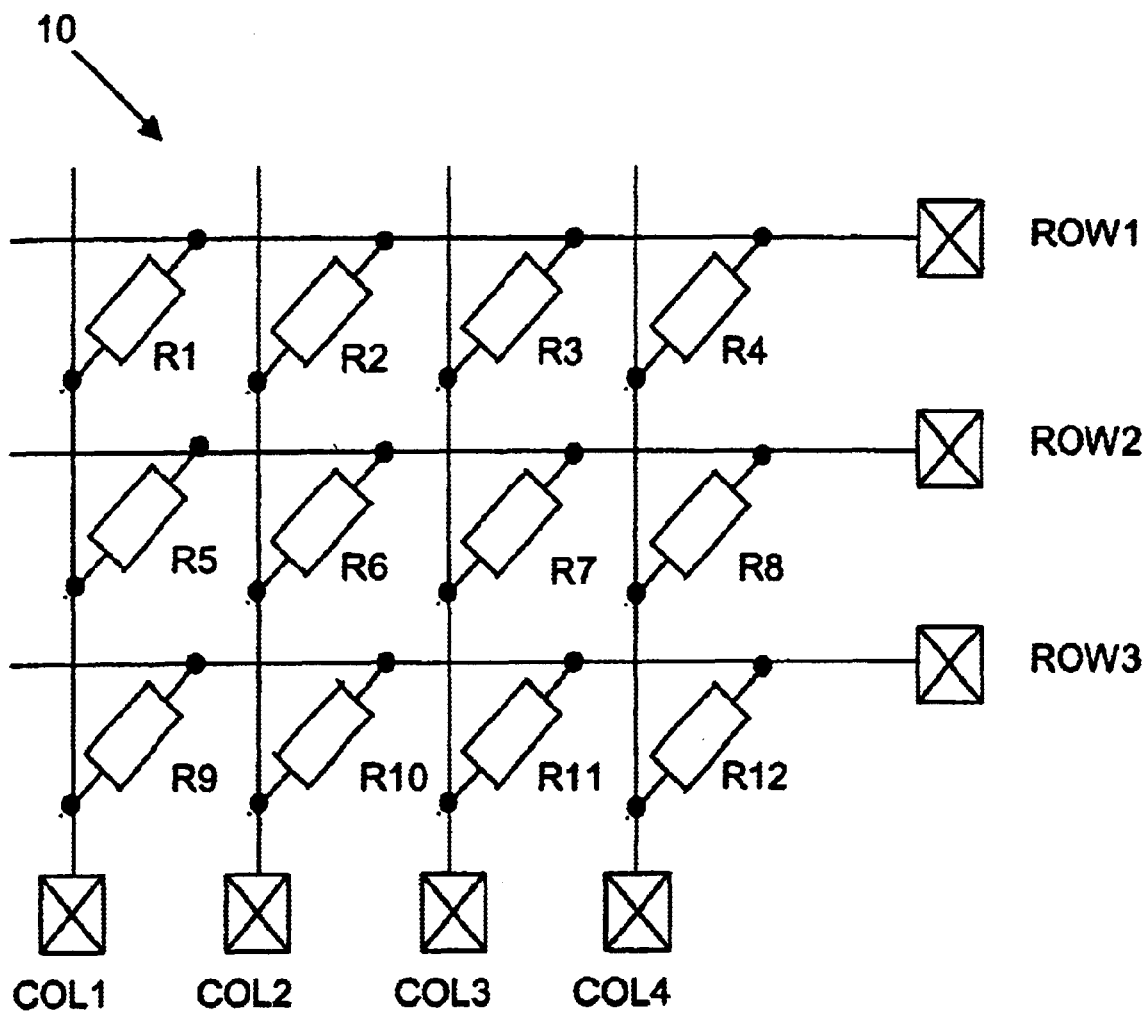
FIG. 1 is a schematic diagram of the force-dependent resistors of a prior art sensor mat.

Referring now to the figures of the drawing in detail and first, particularly, to FIG. 1 thereof, there is shown a schematic diagram of a prior art sensor mat 10. The sensor mat 10 has column lines COL1–COL4, row lines ROW1–ROW3, and force-dependent resistors R1–R12 that have been connected between the column lines COL1–COL4 and the row lines ROW1–ROW3 to form a matrix. Each one of the force-dependent resistors R1–R12 will typically have a resistance value of between 10 K ohms and 500 K ohms. Although only four column lines and three row lines have been illustrated, a typical sensor mat will be much larger and can include, for example, thirteen columns and nine rows of force-dependent resistors. As previously discussed, it is difficult to manufacture the force-dependent resistors R1–R12 of the sensor mat 10 such that their non-activated resistance values will be within a narrow tolerance range. After the sensor mat 10 has been manufactured, the actual resistance values of the non-activated force-dependent resistors R1–R12 must be determined so that the deviations from the expected values can be taken into account by a microcontroller, for example, which evaluates signals from the sensor mat 10. However, determining the actual resistance values of the non-activated force-dependent resistors R1–R12 can prove to be difficult due to tolerance variations and leakage currents that will only effect certain force-dependent resistors R1–R12.

Figure 2:
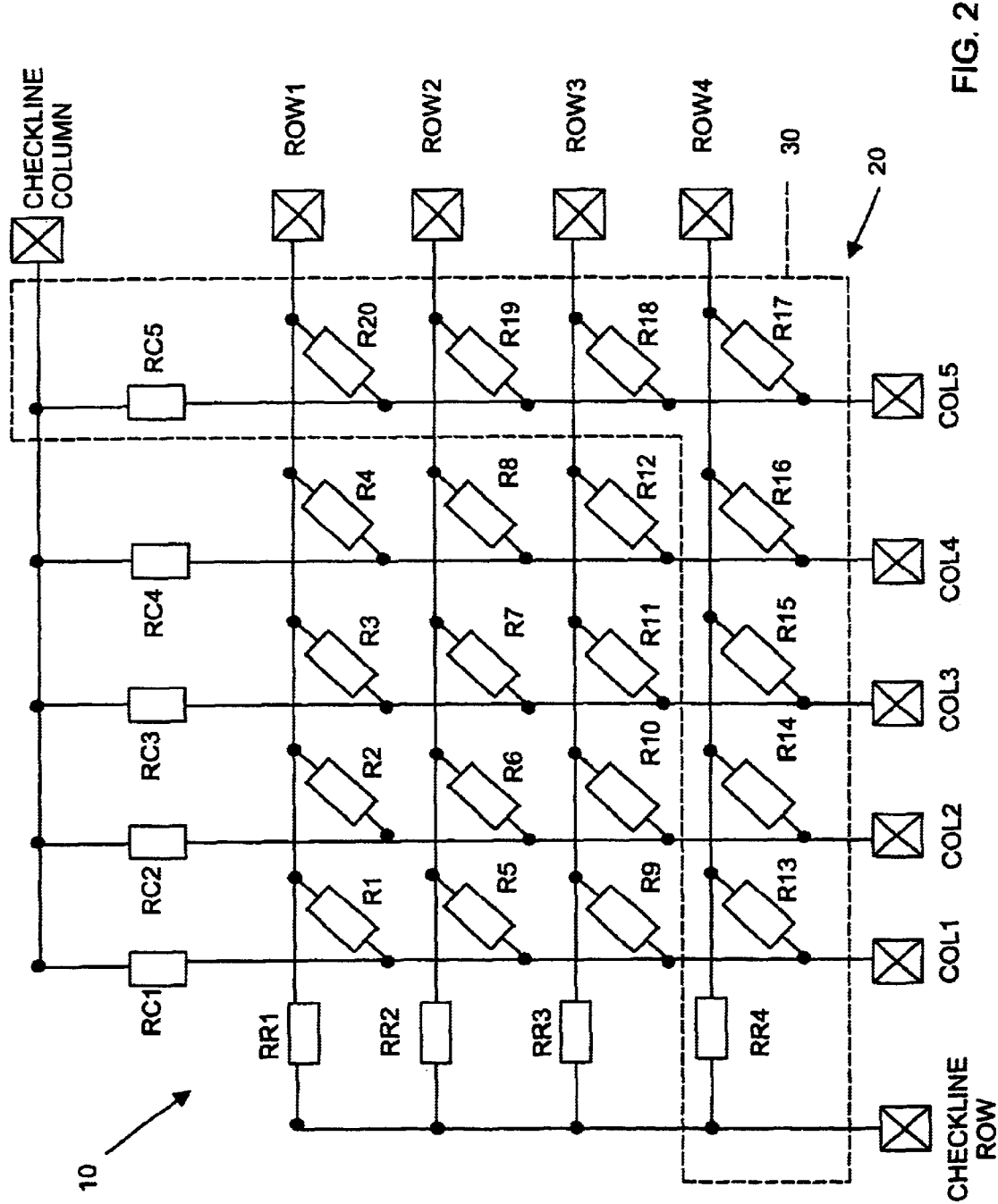
FIG. 2 is a schematic diagram of an inventive sensor mat configuration that includes a sensor mat and a printed circuit board with fixed resistors connected to form an added resistor row and an added resistor column of the matrix.

Referring now to FIG. 2, there is shown an inventive sensor mat configuration 20 that includes the sensor mat 10 with the force-dependent resistors R1–R12 which together with the column lines COL1–COL4 and the row lines ROW1–ROW3 form a matrix. An additional row and an additional column of the matrix is formed by configuring fixed resistors R13–R20 on a printed circuit board 30. Fixed resistors R17–R20 form an additional column of the matrix, while fixed resistors R13–R17 form an additional row of the matrix. Dashed lines have been shown to indicate the printed circuit board 30 upon which the fixed resistors R13–R20 are located. It should be understood that all of the components external to the dashed lines are components of the sensor mat 10.

The first terminal of each one of the fixed resistors R13–R16 is connected to a respective one of the column lines COL1–COL4. The first terminal of the fixed resistor R17 is connected to the additional column line COL5 that is formed on the printed circuit board 30. The second terminals of the fixed resistors R13–R17 are all connected together to form an additional row line ROW4 of the matrix. The first terminals of the fixed resistors R17–R20 are connected together to form the additional column line COL5 of the matrix. The second terminal of each one of the fixed resistors R17–R20 is connected to a respective one of the row lines ROW1–ROW4.

It is very difficult to accurately determine the actual resistance values of the force-dependent resistors R1–R12 of the sensor mat 10 because of tolerance and or/leakage problems that can effect only certain ones of the force-dependent resistors R1–R12. By adding the additional fixed resistors R13–R16, which have each been connected to a respective existing column line COL1–COL4 of the sensor mat 10, it is now possible to accurately determine the resistance values of the force-dependent resistors R1–R12. Because the fixed resistors R13–R16 can be produced separately from the sensor mat 10, these resistors R13–R16 can be produced to have resistance values that are in a very narrow tolerance range. The fixed resistors R13–R16 have a high resistance, for example, 500 K ohms.

The actual resistance value of any one of the force-dependent resistors R1–R12 can be determined using the following steps. In the following example, we will determine the actual unloaded resistance of force-dependent resistor R5. First, we must determine the current flowing through column line COL1 that is due to leakage currents. A known fixed voltage, for example, 5V is connected to column line COL1, and row line ROW4 is connected to a fixed reference potential, ground for example. All other row lines ROW1–ROW3, and all other column lines COL2–COL5 are connected to 5V to try to avoid influences from the other resistances in the matrix. The current $I_{meas}$ flowing through the column line COL1 to the rowline ROW4 is then measured. This measured current can be represented as the current flowing through R13+the current due to leakage currents, for example, $I_{meas}=I_{expected(R13)}+I_{error}$. Since the actual value of R13 is known within a narrow tolerance range, and since the voltage drop across R13 is known, the expected current $I_{expected(R13)}$ that should flow through R13 can be calculated. The current due to leakage currents effecting column line COL1 can be calculated by $I_{error}=I_{meas}-I_{expected(R13)}$. This error current can then be taken into account when measuring the current flowing from the column line COL1 to other row lines ROW1–ROW3.

After the leakage current $I_{error}$ associated with a column line has been determined, one can determine the actual resistance value of any one of the force-dependent resistors connected to that column line. To determine the actual unloaded resistance of force-dependent resistor R5, for example, we connect 5V to column line COL1, and ground potential to row line ROW2. All other row lines ROW1, ROW3, and ROW4, and all other column lines COL2–COL5 are connected to 5V to try to avoid influences from the other resistances in the matrix. The current $I_{meas}$ flowing through the column line COL1 to the rowline ROW2 is then measured. This measured current can be represented as the current flowing through R5+the current due to leakage currents, for example $I_{meas}=I_{expected(R5)}+I_{error}$. However, since $I_{error}$ has been estimated using the previous measurement involving R13, the actual resistance of the force-dependent resistor R5 can be calculated from $R5_{(actualresistance)}=5V/(I_{meas}-I_{error})$.

It should be clear that the leakage current $I_{error}$ associated with any one of the column lines COL1–COL4 of the sensor mat 10 can be calculated in an analogous way. By knowing the associated leakage current, the actual resistance of any one of the force-dependent resistors can be calculated, after taking a measurement of the current flowing from the appropriate column line to the appropriate row line. An important feature is that the leakage currents are determined using the fixed resistors R13–R16 having resistance values that are within a narrow tolerance range as compared to the resistance values of the resistors that can be constructed in the Sensor mat 10.

Fixed resistors RC1–RC4 and RR1–RR3 are typically printed on the sensor mat 10. Each one of the fixed resistors RC1–RC4 of the sensor mat 10 has been connected to a respective one of the column lines COL1–COL4. Fixed resistor RC5 on the printed circuit board 30 has been connected to the added column line COL5. The other ends of the resistors RC1–RC5 are all connected together and to a line CHECKLINE COLUMN. Each one of the fixed resistors RR1–RR3 has been connected to a respective one of the row lines ROW1–ROW3. The fixed resistor RR4 on the printed circuit board 30 has been connected to the added row line ROW4 of the matrix. The other ends of the resistors RR1–RR4 are all connected together and are connected to a line CHECKLINE ROW. The fixed resistors RC1–RC5 enable one to determine whether there is an interruption on one of the column lines COL1–COL5 by taking a suitable measurement between the line CHECKLINE COLUMN and the associated one of the column lines COL1–COL5. Similarly, the fixed resistors RR1–RR4 enable one to determine whether there is an interruption on one of the row lines ROW1–ROW4 by taking a suitable measurement between the line CHECKLINE ROW and the associated one of the row lines ROW1–ROW4. The fixed resistors RC1–RC4 and RR1–RR3 are part of the sensor mat 10 and cannot be produced to have a resistance value within a narrow tolerance range, however, this is inconsequential since they are only being used to determine whether an interruption exists on one or more of the column lines COL1–COL4 or on one or more of the row lines ROW1–ROW3.

We claim:

1. A sensor mat configuration, comprising:

a sensor mat having row lines, column lines, and a plurality of force-dependent resistors connected between said row lines and said column lines to form a matrix having rows and columns; and a printed circuit board having a first plurality of fixed resistors;

each one of said first plurality of said fixed resistors having a first terminal and a second terminal;

said first terminal of each one of said first plurality of said fixed resistors being connected to a respective one of said column lines and said second terminal of each one of said first plurality of said fixed resistors being connected together, thereby forming an additional row of said matrix.

2. The sensor mat according to claim 1, wherein:

said printed circuit board and said first plurality of said fixed resistors are not integral parts of said sensor mat.

3. The sensor mat configuration according to claim 1, wherein:

said printed circuit board includes a second plurality of fixed resistors;

each one of said second plurality of said fixed resistors having a first terminal and a second terminal; and said first terminal of each one of said second plurality of said fixed resistors being connected to a respective one of said row lines and said second terminal of each one of said second plurality of said fixed resistors being connected together, thereby forming an additional column of said matrix.

4. The sensor mat according to claim 3, wherein:

said printed circuit board, said first plurality of said fixed resistors, and said second plurality of said fixed resistors are not integral parts of said sensor mat.

5. The sensor mat configuration according to claim 1, wherein:

said sensor mat includes a plurality of fixed column resistors for checking whether interruptions exist on said column lines and a plurality of fixed row resistors for checking whether interruptions exist on said row lines;

each one of said plurality of said fixed column resistors of said sensor mat having a first terminal connected to a respective one of said column lines;

each one of said first plurality of said fixed column resistors of said sensor mat having a second terminal;

said second terminal of each one of said first plurality of said fixed column resistors of said sensor mat being connected together;

each one of said plurality of said fixed row resistors of said sensor mat having a first terminal connected to a respective one of said row lines;

each one of said first plurality of said fixed row resistors of said sensor mat having a second terminal; and said second terminal of each one of said first plurality of said fixed row resistors of said sensor mat being connected together.

6. The sensor mat configuration according to claim 5, wherein:

said printed circuit board includes a second plurality of fixed resistors;

each one of said second plurality of said fixed resistors having a first terminal and a second terminal;

said first terminal of each one of said second plurality of said fixed resistors being connected to a respective one of said row lines and said second terminal of each one of said second plurality of said fixed resistors being connected together, thereby forming an additional column of said matrix.

7. The sensor mat according to claim 6, wherein:

said printed circuit board, said first plurality of said fixed resistors, and said second plurality of said fixed resistors are not integral parts of said sensor mat.

8. A method of determining a resistance value of a force-dependent resistor of a sensor mat, which comprises:

providing a sensor mat having row lines, column lines, and a plurality of force-dependent resistors connected between the row lines and the column lines to form a matrix having rows and columns;

providing a printed circuit board having a plurality of fixed resistors;

providing each one of the first plurality of the fixed resistors with a first terminal and a second terminal;

forming an additional row of the matrix by connecting the first terminal of each one of the plurality of the fixed resistors to a respective one of the column lines and by connecting the second terminal of each one of the plurality of the fixed resistors together;

using the plurality of the fixed resistors to determine leakage currents effecting the column lines; and using the leakage currents to determine actual resistance values of the plurality of force-dependent resistors.

\* \* \* \* \*